March 6, 1934.  E. R. COLLINS  1,949,708
GLASS HOLDER
Filed Nov. 29, 1933
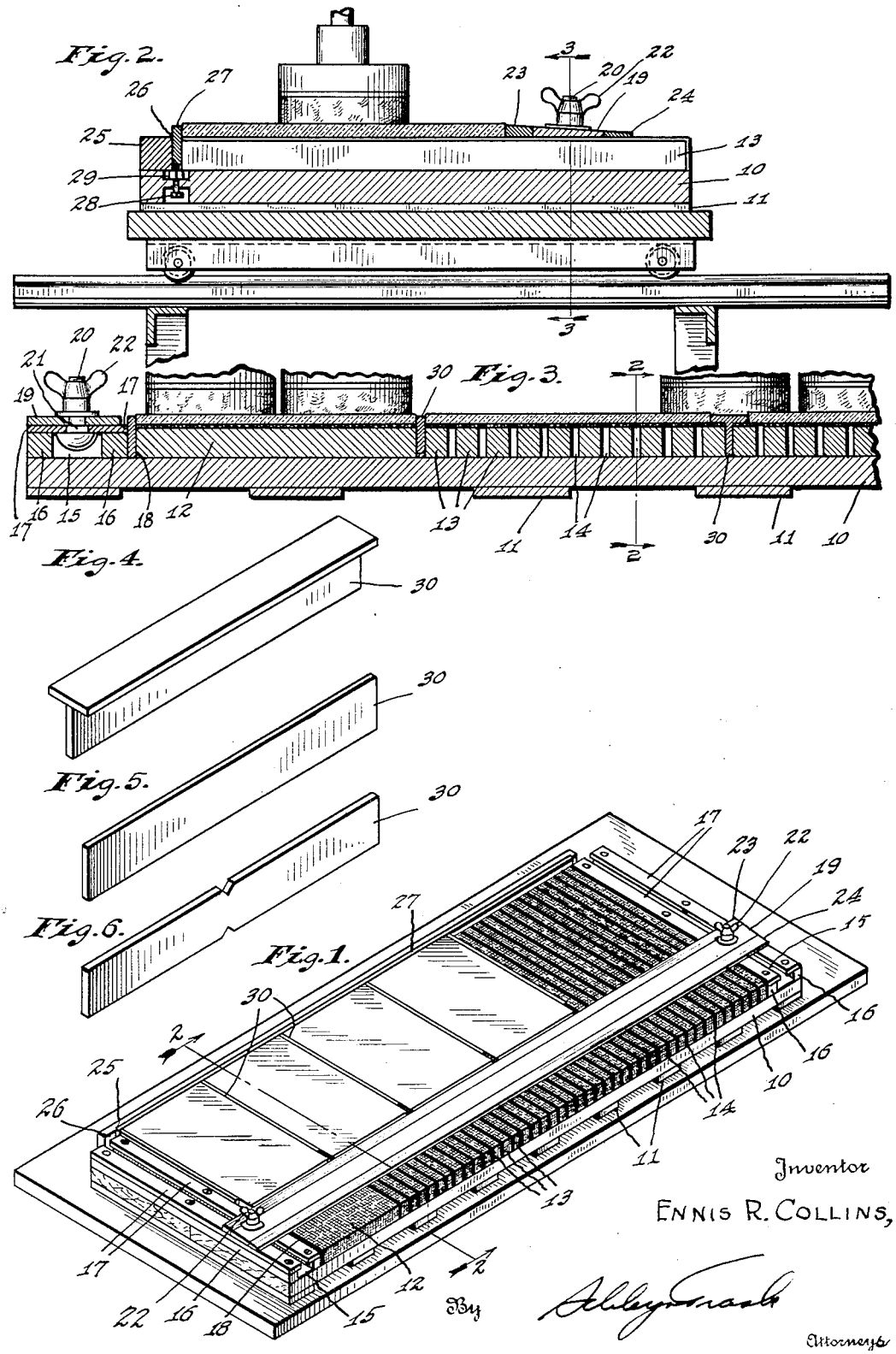
Inventor
ENNIS R. COLLINS,
By
Attorneys Patented Mar. 6, 1934

1,949,708

UNITED STATES PATENT OFFICE 1,949,708

GLASS HOLDER

Ennis R. Collins, Indianapolis, Ind.

Application November 29, 1933, Serial No. 700,184

4 Claims. (Cl. 51—240)

This invention relates to a machine for polishing glass, and more particularly to a table for holding a plurality of ready-cut panes of glass in a manner to permit their simultaneous polishing with the usual polishing machines, and permit the use of more than a single polishing head for each pane of glass, and without limiting movement of such heads to the confines of a single pane.

In the usual glass polishing or re-polishing machine the glass is supported beneath a series of rotating polishing heads by a table which is arranged to be moved in both of two directions, so that all portions of the glass may be brought into position directly underlying the heads, for polishing. In many cases, the glass-supporting table is automatically reciprocated in one direction, so as to effect substantially continuous movement of the glass being polished with respect to the position of the rotating polishing heads.

This system is quite satisfactory when the glass being polished is in one large sheet, especially because it is then possible to use several sets of polishing heads with each set including two or more heads. However, in cases where the panes of glass to be polished are of a relatively small size, considerable difficulty has been encountered. It has been found necessary to use only a single polishing head in order to permit the necessary relative lateral movement of the glass with respect to the polishing head without permitting the polishing head to extend past the edges of the glass. In addition, it has long been considered desirable to polish several panes of such small-sized panes of glass simultaneously on machines equipped with several polishing heads. In doing so, it has been necessary to use only one polishing head of each set. In such an arrangement, the glass panes are all supported on a common table, and it is of the utmost importance that each pane of glass be held securely against twisting and other lateral movement. This problem is especially acute because of the necessity of using only a single polishing head, for the frictional drag between the rotating polishing head and the pane of glass tends strongly to turn the glass about the axis of rotation of the head. If this turning occurs, the edges of one pane of glass may strike the next adjacent pane and crack or break it, and the panes of glass may be thrown completely off the table.

It has been proposed to hold the several panes of glass on the common glass-supporting table by providing such table with a felt top, and pressing the panes on such top while the felt is wet, so that the glass panes cling tenaciously to such wet felt. While this method has been used with some success, it often permits the slippage of one or more of the panes of glass, especially as the polishing continues and the continued friction between the polishing head and the glass heats the glass and dries the wet felt.

By my invention, I provide for positively holding the glass against turning or other lateral movement, and at the same time so arrange the several panes of glass to permit the use of sets of polishing heads operating on all the panes as a unit, instead of only a single polishing head on each pane of glass, thus securing the desirable effects of a pair of polishing heads rotated in opposite directions. In effect, I so support the several small panes of glass that they may be polished in substantially the same manner as if they constituted one large pane of glass.

In accomplishing the objects of my invention, I provide a table-base, and on that base a glass-supporting top. Along one longitudinal edge of such top I provide a stop bar, which is desirably removable; and over the glass supporting top I arrange a straight-edge which can be adjusted to various positions parallel with such stop bar. These two parts, the stop bar and the straight edge engage the edges of the panes of glass which lie longitudinally of the table. In order that the several panes of glass may be separated from each other the table top has a series of closely spaced grooves extending transversely across it. When the glass is mounted on the table, a spacing bar is inserted in one of such grooves near the end of the table, and a pane of glass is then laid on the surface of the table with its edge against such space bar. A second space bar is then inserted in the groove nearest the opposite edge of such pane of glass and a second pane of glass is laid on the table with its edge against said second space bar. A third space bar is then inserted in a groove near the edge of the second pane of glass; and the operation is continued until the desired number of panes have been placed on the table.

In order to minimize the gap between the edge of a pane of glass and its adjacent space bars, I desirably provide at least two different forms of such space bars. In one form, the space bar is rectangular in cross section, while in the other case the bar is of T-shaped cross section, so that its cross-arms may lie on the top and extend toward the edge of the pane of glass.

The accompanying drawing illustrates my invention: Fig. 1 is an isometric view of my glass-supporting table with four panes of glass in place on its top; Fig. 2 is a transverse section on the line 2—2 of Figs. 1 and 3; Fig. 3 is a longitudinal fragmentary section on the line 3—3 of Fig. 2, showing the arrangement of the panes of glass and of the polishing heads; and Figs. 4, 5, and 6 are isometric views of various forms of space bars.

The foundation of my glass polishing table is a base 10, which may conveniently be made of wood. If made of this material, it must be constructed so as to prevent warping, and this may conveniently be accomplished by the use of cleats 11 secured to the bottom of the base 10 and extending across the grain of the wood which forms the base 10. On this base 10 is mounted the glass-supporting top which may conveniently be formed of a solid block 12 located near one end of the base 10; and of a series of narrower blocks 13 which are arranged in a spaced series extending from the solid block 12 to the other end of the base 10. These blocks 13 are all of the same height as the solid block 12 and are conveniently of equal dimensions in other directions. They form with the block 12 an upper planar surface which is cut through at spaced intervals along its length by a series of transverse grooves 14 between the blocks 13. This planar surface is desirably covered with a material such as felt or cork to form a glass-supporting surface.

Across each end of the base 10 there is a guideway, which may conveniently take the form of an under-cut groove 15. As shown in the drawing, these grooves 15 are formed of two spaced blocks 16 which support a pair of plates 17 projecting toward each other and overlying part of the space between the blocks 16.

The guide at the end of the base which carries the solid block 12 is conveniently spaced from such solid block a distance equal to the distance between the blocks 13, to form a groove 18.

Co-operating with both of the guides at the ends of the base 10 is a straight edge 19. This straight edge is disposed longitudinally along the glass-supporting surface and is provided at its ends with means for clamping it to the guides. As shown, this means comprises a bolt 20 with its head disposed below the two plates 17 and with a rectangular boss 21 riding between such plates 17. A wing nut 22 serves to clamp the straight edge in fixed position.

Desirably, the straight edge 19 is wedge-shaped in cross section so as to have a thick edge 23 and a thin edge 24, for use with glass of different thicknesses. Also, the straight edge is desirably made from a central bar of steel with strips of a softer material such as lead along its side edges, to provide edges which will have less tendency to crack or chip the glass.

Along one longitudinal edge of the base 10 there is a strip 25 spaced slightly from the ends of the blocks 12 and 13 to provide a groove 26. In such groove 26 there is disposed a stop-bar 27, adapted to project above the glass-supporting surface of the blocks 12 and 13. Conveniently, this stop-bar 27 is adjustable in height; and as shown, the adjusting means is a pair of bolts 28 passing vertically through the base 10 and threaded through nuts 29 imbedded in the upper surface of such base 10. The heads of the bolts 28 lie in countersunk openings in the bottom of the base 10, and the ends of the bolts 28 project upwardly into the groove 26.

As is apparent from Fig. 2, panes of glass supported by the upper surface of the blocks 12 and 13 are held against lateral movement along their edges which lie longitudinally of the table by the stop-bar 27 and one edge of the straight-edge 19. For spacing the panes of glass along the table, and separating their adjacent transversely lying edges, there are a series of space-bars 30 disposed in appropriate ones of the grooves 14. In order to embrace the transversely lying edges of the panes of glass as closely as possible, there may be several kinds of these space bars 30. I have shown two kinds of such space bars in Figs. 4 and 5. The space bars shown in Fig. 5, and also shown in position in the left portion of Fig. 3, are merely strips of rectangular cross-section and of a height sufficient when disposed in the grooves 14 to project above the glass-supporting surface substantially to the top surface of the glass being polished. The space bar shown in Fig. 4, and in position at the right in Fig. 3, is T-shaped in cross section. The vertical member of such T is of substantially the same height and thickness as the groove 14, and the cross member of the T has a thickness substantially equal to the thickness of the glass. The cross member of the T is of such length that when a space-bar of T-shaped cross section is in place in a groove 14, the cross member of such T extends substantially half-way to the opposite edge of the next adjacent groove 14. By this arrangement, it is possible to embrace the transversely lying edges of any pane of glass fairly closely, the greatest gap possible being half the distance between similar edges of adjacent grooves 14.

In addition to there being two cross sectional shapes of space bars 30, it is desirable also to provide several different lengths of each kind of space bar; for it is desirable that the space bars be slightly shorter than the panes of glass being polished, in order to permit insertion of the operator's fingers between such panes of glass to lift them from the table.

Since the height of the space bars is desirably correlated with the thickness of a glass being polished, it is convenient to have more than one set of space bars, with the second set of a different height than the first to cooperate with glass of a different thickness. When a second set of space bars is used, I find it convenient to mark the space bars of the second set as with a notch, to distinguish them from the bars of the first set. This is illustrated in Fig. 6.

In using my glass polishing table, the stop bar 27 is put in position and adjusted to the proper height for the thickness of glass to be polished. A space bar is then inserted in the groove 18 at the end of the table, and a first pane of glass is put in place over the solid block 12. This pane of glass will usually extend beyond the edge of such block 12, for the width of the block 12 is chosen to be at least as wide as the narrowest pane intended to be polished. With this first pane of glass in place with one edge against the stop bar 27 and another edge in engagement with the space bar in the groove 18, a second space bar of either of the forms shown in Figs. 4 and 5 is inserted in the groove nearest the edge of such first pane of glass. Then a second pane is put in place against this space bar and the stop-bar 27; and a third space bar is inserted in the groove nearest the edge of the second pane of glass. This series of steps is continued until as many panes of glass have been put on the table as is desired. The straight edge 19 is then fastened in place with its appropriate edge against the longitudinally extending edges of the several panes of glass on the table.

The glass on the table is now ready for polishing, and the table is placed on the bed of the polishing machine, the polishing blocks lowered against the surface of the glass, and the machine put into operation. With the several panes of glass supported on my table, the polishing operation can be carried on substantially as though the glass were in one continuous sheet. It is therefore unnecessary to use only a single polishing head for each pane of glass, but instead sets of two or more polishing heads, rotating in similar or opposite directions, may be used. The glass panes are held securely against rotation or any lateral movement, and can not slip or chip or crack each other.

When the polishing operation is completed, the panes of glass may be removed either by first lifting out the stop-bar 27 and picking up the glass by its ends which lie against that stop-bar; or by taking hold of the glass through the openings between the panes and at the ends of the several space bars. Another set of similarly sized panes of glass may then be put on the polishing table without changing the various adjustments or removing the space bars. My table thus is of especial advantages where a large number of similarly sized panes of glass are to be polished.

I claim as my invention:

1. A glass polishing table, comprising a base having a glass supporting top thereon, a transversely extending guide at each end thereof, a longitudinal groove along one edge thereof, a stop-bar removably fitted in said groove with its top edge extending above said top, means for vertically adjusting said stop-bar, a movable straight-edge releasably secured at its ends to said guides and arranged to be moved to various positions of adjustment parallel to said stop-bar, there being a series of closely spaced transverse grooves in said top, and a set of space-bars adapted to be inserted in said grooves for separating panes of glass supported on said top.

2. The invention set forth in claim 1 with the addition that some of said space-bars are T-shaped in cross-section with the cross-member thereof adapted to extend substantially half way across the space between similar edges of adjacent grooves, whereby space bars may be arranged in any case to extend to within such half distance of the transversely lying edge of a pane of glass.

3. A glass-polishing table, comprising a base having a glass supporting top thereon, a stop-bar along one longitudinal edge thereof, a straight-edge movably secured on said top and arranged to be moved to various positions of adjustment parallel to said stop-bar, there being a series of closely spaced transverse grooves in said top, and a set of space-bars adapted to be inserted in said grooves for separating panes of glass supported on said top.

4. A glass polishing table, comprising a base having a glass supporting top thereon, a stop-bar along one longitudinal edge thereof, means for vertically adjusting said stop-bar to increase or decrease the extent to which it projects above said top, a two edged straight-edge movably secured on said top in adjustable parallel relation with respect to said stop-bar, said straight edge being wedge-shaped in cross section and adapted to be reversed whereby to present either its thick edge or its thin edge toward said stop-bar, there being a series of closely spaced transverse grooves in said top, and a set of space-bars adapted to be inserted in said grooves for separating panes of glass supported on said top, some of said space bars being adapted to project above said top substantially as high as the thick edge of said straight edge, and others thereof only as far as the thin edge of said straight edge.

ENNIS R. COLLINS.